(12) United States Patent
Dumont et al.

(10) Patent No.: US 8,331,771 B2
(45) Date of Patent: Dec. 11, 2012

(54) METHOD FOR RECORDING TWO CONCURRENT A/V INPUT SIGNALS

(75) Inventors: Frank Dumont, Singapore (SG); Chee Lam Tan, Singapore (SG)

(73) Assignee: Thomson Licensing, Boulogne Billancourt (FR)

( * ) Notice: Subject to any disclaimer, the term of this patent is extended or adjusted under 35 U.S.C. 154(b) by 1195 days.

(21) Appl. No.: 11/328,561

(22) Filed: Jan. 10, 2006

(65) Prior Publication Data

US 2006/0153543 A1    Jul. 13, 2006

(30) Foreign Application Priority Data

Jan. 12, 2005  (EP) ................................. 05300022

(51) Int. Cl.
- H04N 5/76 (2006.01)
- H04N 5/931 (2006.01)
- H04N 5/932 (2006.01)
- H04N 5/92 (2006.01)
- H04N 5/917 (2006.01)
- H04N 5/78 (2006.01)

(52) U.S. Cl. ........ 386/341; 386/212; 386/294; 386/291; 386/292; 386/326; 386/328; 386/324

(58) Field of Classification Search ............... 386/46, 386/95, 125–126, 341, 212, 294, 291, 292, 386/326, 328, 324

See application file for complete search history.

(56) References Cited

U.S. PATENT DOCUMENTS

| | | | | |
|---|---|---|---|---|
| 7,082,613 B1 * | 7/2006 | Mineyama | ...................... | 725/46 |
| 7,212,725 B2 * | 5/2007 | Gunji et al. | ...................... | 386/46 |
| 7,602,846 B1 * | 10/2009 | Wu et al. | .................. | 375/240.12 |
| 2002/0061181 A1 | 5/2002 | Honjo | | |
| 2002/0092021 A1 | 7/2002 | Yap et al. | | |
| 2002/0172496 A1 | 11/2002 | Gunji et al. | | |
| 2003/0228126 A1 | 12/2003 | Buxton | | |
| 2004/0247282 A1 | 12/2004 | Nishi et al. | | |

FOREIGN PATENT DOCUMENTS

| | | |
|---|---|---|
| EP | 1 213 920 A2 | 12/2001 |
| EP | 1 365 412 A1 | 11/2003 |
| GB | 2352920 | 7/2001 |
| JP | 2000215545 | 8/2000 |
| JP | 2001211420 | 8/2001 |
| JP | 2002184104 | 6/2002 |
| JP | 2002218393 | 8/2002 |
| JP | 2002330375 | 11/2002 |
| JP | 2002374487 | 12/2002 |
| JP | 2003052013 | 2/2003 |

* cited by examiner

*Primary Examiner* — Thai Tran
*Assistant Examiner* — Daquan Zhao
(74) *Attorney, Agent, or Firm* — Robert D. Shedd; Paul P. Kiel

(57) ABSTRACT

The present invention relates to a method for simultaneously recording two a/v input signals using only a single digital a/v compressor, and an apparatus for reading from and writing to recording media capable of performing such method.

This object is achieved by a method for recording a first a/v input signal and a second a/v input signal on a first recording unit for recording compressed digital a/v data, having the steps of:
  recording the first a/v input signal on the first recording unit;
  recording the second a/v input signal on the second recording unit;
  after completing the recording of the first a/v input signal on the first recording unit, reading the second a/v input signal recorded on the second recording unit; and
  recording the second a/v input signal read from the second recording unit on the first recording unit and/or the second recording unit.

14 Claims, 2 Drawing Sheets

METHOD FOR RECORDING TWO CONCURRENT A/V INPUT SIGNALS

FIELD OF THE INVENTION

The present invention relates to a method for recording two concurrent a/v input signals, and to an apparatus for reading from and writing to recording media capable of performing such method.

BACKGROUND OF THE INVENTION

Nowadays a plurality of combination devices having both a hard disk drive (HDD) and a drive for recordable optical media, e.g. a recording drive for digital versatile disks (DVD), have become available on the market. Often these combination device are equipped with two or more inputs, such as an analog and a digital tuner, USB or IEEE1394 interfaces etc. The inputs are usually connected to a digital a/v compressor such as an MPEG encoder for either performing MPEG encoding and adding the navigation packs (NAV Packs) needed for DVD recording, or for transcoding a received transport stream (TS) into a program stream (PS) including such NAV Packs. This means that despite the presence of two different recording devices only the signal of one of the sources can be recorded at a time. One possibility to overcome this limitation is to provide an additional MPEG encoder IC. However, this solution is very costly and consequently not feasible for consumer devices. A cheaper solution is desirable.

US 2002/092021 discloses a digital video recorder with enhanced features. The video recorder is capable of simultaneously recording multiple a/v input signals, e.g. on hard disks or optical disks. For recording the received input a/v signals are transcoded, if necessary, by a decoder/decrypter capable of simultaneously handling a plurality of input streams.

EP 1 213 920 discloses an apparatus for simultaneously recording multiple digital a/v input signals. For recording the received input a/v signals are encoded. The apparatus uses an MPEG encoder capable of simultaneously encoding at least two a/v input signals.

US 2003/228126 discloses a multiple programmable video recorder capable of receiving and recording at least two input a/v signals. Theses signals are encoded/transcoded, if necessary, and stored on a hard disk in an interleaved manner. For each received a/v input signal a dedicated encoder is provided.

In the following an a/v (input) signal is to be understood as an analog or digital signal including audio and/or video information, whereby in case of a digital signal this signal may either be compressed or non-compressed.

SUMMARY OF THE INVENTION

It is an object of the invention to propose a method for recording two concurrent a/v input signals using only a single digital a/v compressor, and an apparatus for reading from and writing to recording media capable of performing such method.

According to the invention, this object is achieved by a method for recording a first a/v input signal and a second concurrent a/v input signal on a first recording unit for recording compressed digital a/v data, having the steps of:
  recording the first a/v input signal on the first recording unit;
  recording the second a/v input signal on the second recording unit;
  after completing the recording of the first a/v input signal on the first recording unit, reading the second a/v input signal recorded on the second recording unit; and
  recording the second a/v input signal read from the second recording unit on the first recording unit and/or the second recording unit.

Preferably, the method further has the steps of:
  converting the first a/v input signal into a first digital a/v input signal in case it is an analog a/v input signal;
  compressing or transcoding the first digital a/v input signal in case it is not yet a compressed digital a/v input signal in a format used by the first recording unit, to obtain a compressed first digital a/v input signal;
  converting the second a/v input signal into a second digital a/v input signal in case it is an analog a/v input signal; and
  before recording the second digital a/v input signal on the first recording unit, compressing or transcoding the second digital a/v input signal in case it is not yet a compressed digital a/v input signal in a format used by the first recording unit, to obtain a compressed second digital a/v input signal.

Favorably the first recording unit is a drive for optical recording media such as (re-)writable DVDs etc., while the second recording unit is a hard disk drive, a video cassette recorder, a further drive for optical recording media, or any other digital media device. When an analog a/v input signal is received at the first input, e.g. from an analog tuner or any other analog video source, this signal is first converted into a first digital a/v input signal. In case a digital a/v input signal is received at the first input, this conversion is of course not necessary. Likewise, an analog a/v input signal received at the second input is converted into a second digital a/v input signal. As before, this conversion is not necessary if a digital a/v input signal is received at the second input. For the conversion preferably an independent video decoder is provided for each input. Alternatively, a single video decoder capable of simultaneously converting two analog a/v input signals can be used. In case only a single video decoder capable of converting just one analog a/v input signal is provided, it has to be ensured that at most one of the inputs receives an analog a/v input signal. The first digital a/v input signal is then compressed, using e.g. an MPEG encoder, and transformed into a compressed digital a/v input signal in accordance with a standard used by the first recording unit. In case the a/v input signal received at the first input already is a compressed digital a/v input signal, the compressed digital a/v input signal may need to be transcoded, as the compressed digital a/v input signal might not be compressed in accordance with the standard used by the first recording unit. For example, when an MPEG transport stream from a digital tuner is received at the first input, a transcoding into an MPEG program stream might be necessary. If, however, the a/v input signal received at the first input is already compressed in a format used by the first recording unit, no processing is necessary. Finally, the compressed or transcoded digital a/v input signal is recorded on the first recording unit. As it is not possible to simultaneously compress or transcode the second digital a/v input signal as well without providing a second a/v compressor, the second digital a/v input signal is directly recorded on the second recording unit without further processing. In this way it is possible to simultaneously record the two input signals on the two recording units. When both input signals are intended to be recorded on the first recording unit, the second digital a/v input signal is recovered from the second recording unit, and compressed or transcoded for recording on the first recording unit. If, however, the second digital a/v input signal is already compressed in a format used by the first recording unit, no processing is necessary. The compressed or transcoded signal can also be re-recorded on the second recording unit, e.g. for further manipulation by a user before recording it on the first recording unit, or for providing this signal to other devices at a later time. In this way the second recording unit serves as a buffer for the second a/v input signal. If the second recording unit is capable of simultaneous or quasi-simultaneous reading and writing, which is the case for a hard disk drive, the processing of the buffered second digital a/v input signal, e.g. transcoding, can already start as soon as the recording of the compressed digital a/v input signal on the first recording unit is finished. Otherwise also the recording on the second recording unit has to be finished before further processing of the buffered digital a/v input signal.

According to a further aspect of the invention, the above object is likewise achieved by an apparatus for reading from and writing to recording media, having:
- a first recording unit for recording a compressed digital a/v signal;
- a second recording unit for recording a digital a/v signal;
- a first input for receiving a first analog or digital a/v input signal;
- a second input for receiving a second analog or digital a/v input signal;
- a video decoder for generating a digital a/v input signal from an analog a/v input signal in case the first input and/or the second input receives an analog a/v input signal;
- a digital a/v compressor for compressing and/or transcoding a digital a/v signal;
- switching means for connecting an input of the second recording unit selectively to the second input, an output of the video decoder, or to an output of the digital a/v compressor
- switching means for connecting an input of the digital a/v compressor to an output of the second recording unit; and
- switching means for connecting the output of the digital a/v compressor to an input of the first recording unit or the input of the second recording unit.

Such an apparatus is capable of performing the method according to the invention. In case only recording of an a/v input signal on the second recording unit is requested, the input of the second recording unit is connected to the digital a/v compressor. If, however, in case of simultaneous recording the digital a/v compressor is used for compressing or transcoding a digital a/v input signal for recording on the first recording unit, the input of the second recording unit is either connected to the second input for directly recording a digital a/v input signal received at this input, or to the output of the video decoder for recording a digital a/v input signal generated by the video decoder from an analog a/v input signal received at the second input. In this way the second digital a/v input signal buffered by the second recording unit can later be recovered from the second recording unit, compressed or transcoded if required, and recorded on the first or second recording unit.

With regard to the video decoder, as already discussed above preferably an independent video decoder is provided for each input. Alternatively, a single video decoder capable of simultaneously converting two analog a/v input signals can be used. In case only a single video decoder capable of converting just one analog a/v input signal is provided, it needs to be ensured that not more than one of the inputs receives an analog a/v input signal.

Favorably, two or more digital a/v input signals are simultaneously or quasi-simultaneously recorded on the second recording unit. For example, if the second recording unit is a hard disk drive, this drive is capable of recording a plurality of input signals at the same time. Likewise, if an apparatus includes further recording units, additional digital a/v input signals can simultaneously be recorded. In this case the second recording unit is regarded as including two or more sub-units, e.g. two or more hard disk drives, a hard disk drive and an additional drive for optical recording media etc.

Preferably, additional data is added to the first digital a/v input signal and/or the second digital a/v input signal during compressing or transcoding. For example, if one of the digital a/v input signals is an MPEG transport stream, navigation packs have to be added to this digital a/v input signal during compressing or transcoding. Similarly, for recording an analog a/v input signal, after converting this signal to a digital a/v input signal navigation packs have to be included in addition to MPEG encoding.

Advantageously, the second digital a/v input signal is the same as the first digital a/v input signal. In case the first digital a/v input signal is a transport stream including more than one program, this allows to subsequently record all programs included in the transport stream on the first recording unit.

In the above the invention has been presented for any type of a/v input signals, i.e. analog or digital, compressed or non-compressed signals. However, the invention is preferably applied if the signal received at the second input is a compressed digital a/v input signal, while the signal received at the first input is either an analog a/v input signal or a digital a/v input signal requiring compressing or transcoding. This is due to the fact that for storing a non-compressed digital a/v input signal on the second recording unit a large amount of storage space is necessary. Therefore, with current storage media only a few minutes of simultaneous recording are possible. Of course, with the advance of available storage space the invention is likewise applicable if an analog or non-compressed digital a/v input signal is received at the second input.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention. In the figures.

DETAILED DESCRIPTION OF PREFERED EMBODIMENTS

Figure 1:
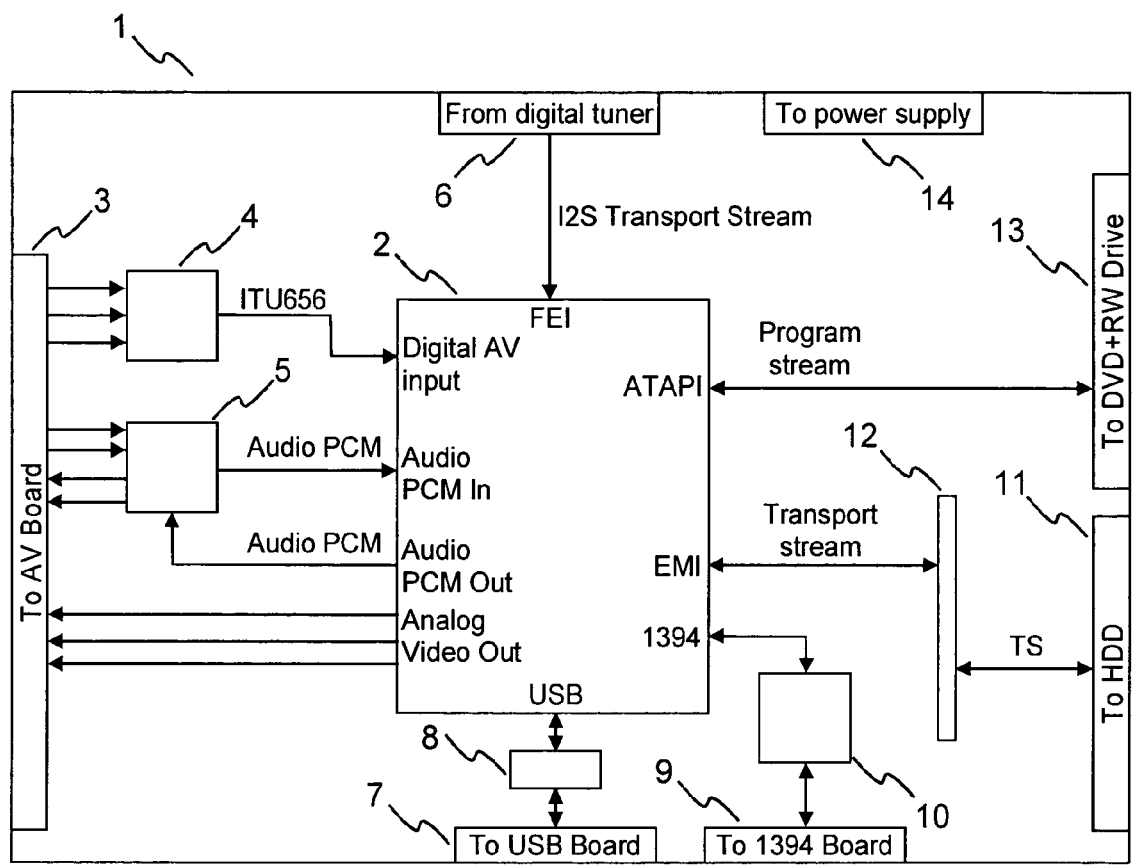
FIG. 1 schematically shows an apparatus for performing a method according to the invention.

FIG. 1 schematically shows an apparatus 1 capable of performing a method according to the invention. The apparatus includes a digital a/v compressor 2, e.g. a microcontroller with MPEG encoder, which is used for compressing or transcoding an a/v input signal. An analog a/v input signal can be received from an AV board via an input 3. Video signals received via this input 3 are, for example, CVBS-, RGB-, or Y/C-signals. These signals are converted to digital a/v input signals, e.g. ITU656-signals, by a video decoder 4 and transmitted to the digital a/v compressor 2. Output signals to the AV board are directly generated by the digital a/v compressor 2, e.g. CVBS.Y/C-, SPDIF-, or RGB/YpbPr-signals. Similarly, audio signals (left and right channel) are received from the AV Board via the input 3 and converted by an audio encoder/decoder 5 into Audio PCM-signals, which are then sent to the digital a/v compressor 2. In addition, Audio PCM-signals from the digital a/v compressor 2 are decoded by the audio encoder/decoder 5 and transmitted to the AV board (left and right channel). The apparatus includes a further inputs for digital a/v input signals, namely an input 6 for receiving a transport stream, e.g. an I2S transport stream or parallel stream, from a digital tuner, an input 7 for receiving data from a USB board via a USB hub 8, and an input 9 for receiving data from an IEEE1394 board via a Firewire controller 10. Similarly, a flash card or other media connector might be present. The apparatus 1 has two interfaces 13, 11 for connecting a first recording unit and a second recording unit. In FIG. 1, the first recording unit connected via the first interface 13 is a DVD+RW drive, while the second recording unit connected via the second interface 11 and an EMI Bus 12 is a hard disk drive. Signals are received from and sent to the DVD+RW drive as program streams, whereas signals are received from and sent to the hard disk drive as program stream PS or as transport streams TS. The apparatus is powered by a power supply 14.

Figure 2:
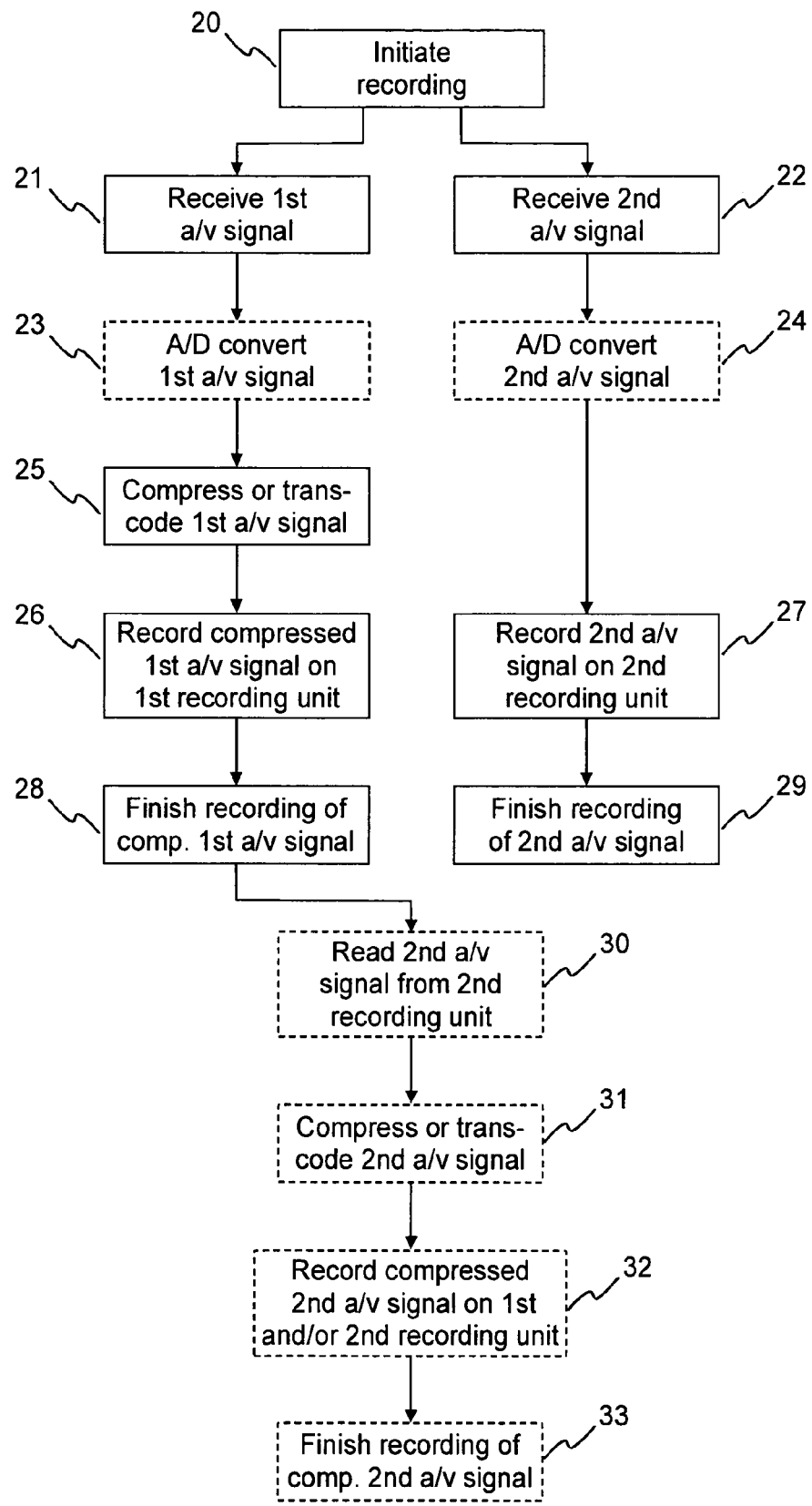
FIG. 2 depicts a method according to the invention for simultaneously recording two a/v input signals.

A method according to the invention for recording two concurrent a/v input signals is depicted in FIG. 2. In the figure, steps that are not in all cases performed are indicated by dotted boxes. When simultaneous recording is initiated 10, a first a/v input signal is received 21 at a first input, while a second a/v input signal is received 22 at a second input. If necessary, i.e. if one or both of the two a/v input signals are analog a/v input signals, the signals are converted 23, 24 into digital a/v input signals. As only a single digital a/v compressor is available, only the first digital a/v input signal is compressed or transcoded 25 to obtain a compressed first digital a/v input signal. This signal is then recorded 26 on the first recording unit, while the second digital a/v input signal is recorded 27 on the second recording unit without further processing. The method for simultaneous recording is terminated when the recording on the first recording unit and the recording on the second recording unit is finished 28, 29. If both a/v input signals are intended to be recorded on the first recording unit, after finishing 28 the recording of the first compressed digital a/v input signal the second digital a/v input signal is read 30 from the second recording unit, compressed or transcoded 31, and recorded 32 on the first recording unit. The compressing or transcoding step 31 is only performed if the second digital a/v input signal is not yet compressed in a format used by the first recording unit. It is likewise possible to record the compressed second digital a/v input signal on the second recording unit as well. The method finally terminates when the recording of the compressed second digital a/v input signal on the first and/or second recording unit is finished 33.

What is claimed is:

1. A method for recording a first digital a/v input signal and a second digital a/v input signal, which is received at the same time as the first digital a/v input signal, on a first recording unit for recording compressed digital a/v data, comprising the steps of:
    receiving the second digital a/v input signal at a second input at the same time as receiving the first digital a/v input signal at a first input;
    compressing or transcoding the first digital a/v input signal when the first digital a/v input signal is received in a compressed format not used by the first recording unit, and generating a compressed first digital a/v input signal;
    recording the second digital a/v input signal on a second recording unit at the same time as recording the compressed first digital a/v input signal on the first recording unit;
    responsive to completing the recording of the first compressed digital a/v input signal on the first recording unit, automatically reading the second digital a/v input signal recorded on the second recording unit;
    after reading the second digital a/v input signal from the second recording unit, automatically compressing or transcoding the second digital a/v input signal when the second digital a/v input signal is received in a compressed format not used by the first recording unit and generating a compressed second digital a/v input signal; and
    automatically recording the second compressed digital a/v input signal on the first recording unit and/or the second recording unit.

2. The method according to claim 1, further comprising the steps of:
    generating the first digital a/v input signal by converting a first analog a/v input signal when a first analog a/v input signal is received ; and
    generating the second digital a/v input signal by converting a second a/v analog a/v input signal when a second analog a/v input signal is received.

3. The method according to claim 1, wherein two or more digital a/v input signals are simultaneously or quasi-simultaneously recorded on the second recording unit.

4. The method according to claim 1, wherein additional data is added to the first digital a/v input signal and/or the second digital a/v input signal during the compressing step.

5. The method according to claim 1, wherein the first recording unit is a drive for optical recording media and the second recording unit is a drive for optical recording media or a hard disk drive.

6. The method according to claim 1, wherein the first and/or the second digital a/v input signal is a transport stream.

7. The method according to claim 1, wherein the second digital a/v input signal is the same as the first digital a/v input signal.

8. An apparatus, comprising:
    a first input capable of receiving a first a/v input signal;
    a second input capable of receiving a second a/v input signal at the same time as receiving the first a/v input signal;
    a first recording device to record an a/v input signal, the first recording device having a first format;
    a second recording device to record an a/v input signal;
    a digital a/v compressor to compress an a/v input signal into a compressed input signal in the first format; and
    a microcontroller, coupled to the input devices, first and second recording devices, and the digital a/v compressor, to execute instructions to
        access a first and second digital a/v input signal,
        compress or transcode the first digital a/v input signal into the first format when the first digital a/v input signal is not in the first format and generate a compressed first digital a/v input signal, record the second digital a/v input signal onto the second recording device at the same time as recording the compressed first digital a/v input signal onto the first recording device, automatically read the second digital a/v input signal from the second recording device responsive to completion of the recording of the compressed first digital a/v input signal, automatically compress or transcode the second digital a/v input signal when the second digital a/v input signal is not in the first format and generate a compressed second digital a/v input signal upon completion of automatically reading the second digital a/v input signal from the second recording device, and automatically record the compressed second digital a/v input signal onto the first recording device.

9. The apparatus of claim 8, further comprising a decoder to convert an analog a/v input signal into a digital a/v input signal;

wherein the microcontroller further executes instructions to instruct the decoder to convert a first analog a/v input signal into a first digital a/v input signal when a first analog a/v input signal is received, and instruct the decoder to convert a second analog a/v input signal into a second digital a/v input signal when a second analog a/v input signal is received.

10. The apparatus of claim 8, wherein the microcontroller executes instructions to record the compressed first digital a/v input signal onto the first recording device and to record the second digital a/v input signal onto the second device simultaneously or quasi-simultaneously.

11. The apparatus of claim 8 wherein the microcontroller instructs the digital a/v compressor to add additional data to a compressed digital a/v input signal.

12. The apparatus of claim 8 wherein the first recording device is a drive for optical recording media and the second recording device is a drive for optical recording media or a hard disk drive.

13. The apparatus of claim 8 wherein the first and/or the second digital a/v input signal is a transport stream.

14. The apparatus of claim 8, wherein the first and second digital a/v input signals are the same.

* * * * *